Sept. 27, 1955 G. V. W. ROTH 2,719,282
SIGNAL LIGHT
Filed Dec. 9, 1953 3 Sheets-Sheet 2
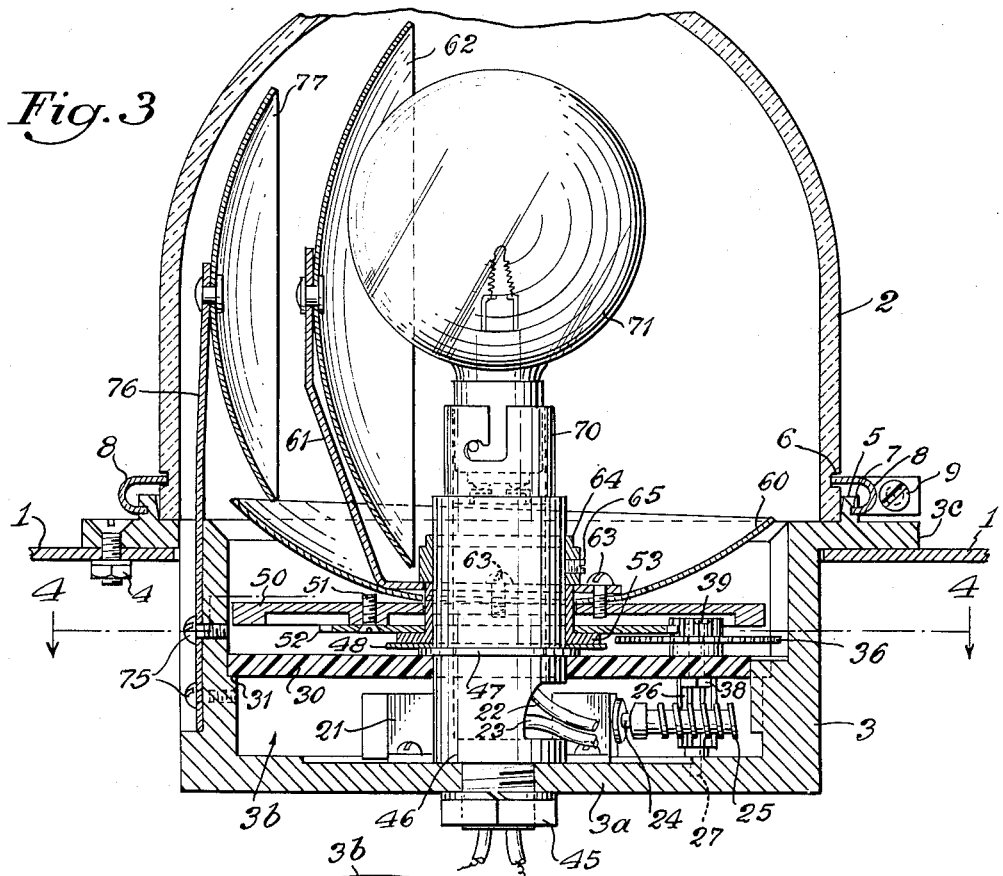
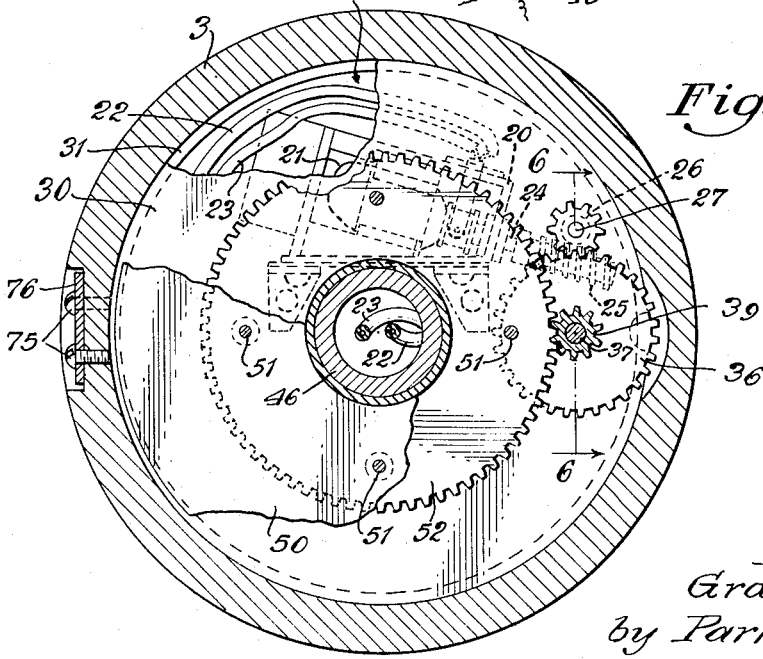
Inventor
Grant V. W. Roth
by Parker & Carter
Attorneys Sept. 27, 1955  G. V. W. ROTH  2,719,282
SIGNAL LIGHT
Filed Dec. 9, 1953  3 Sheets-Sheet 3
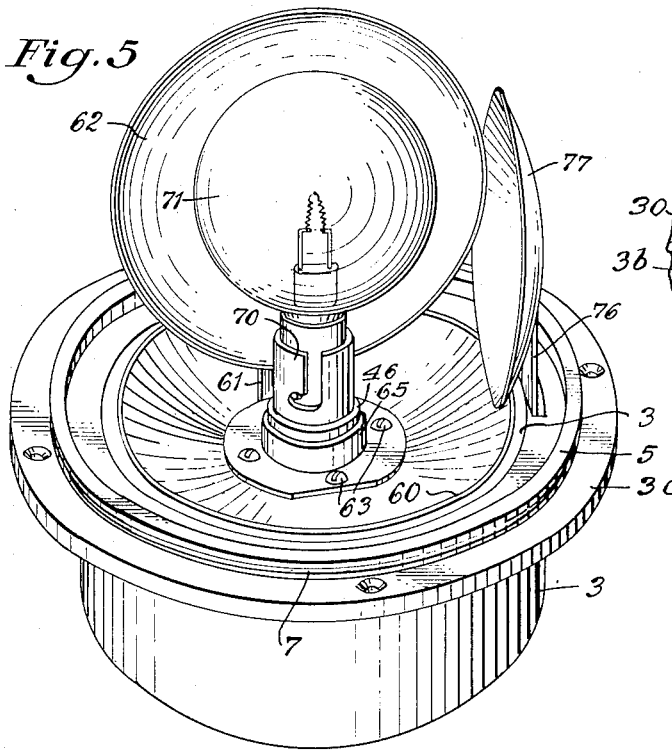
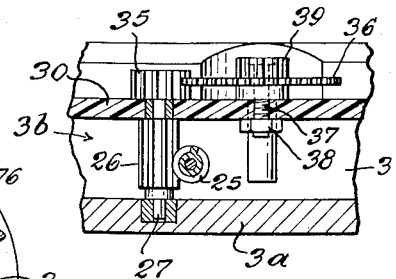
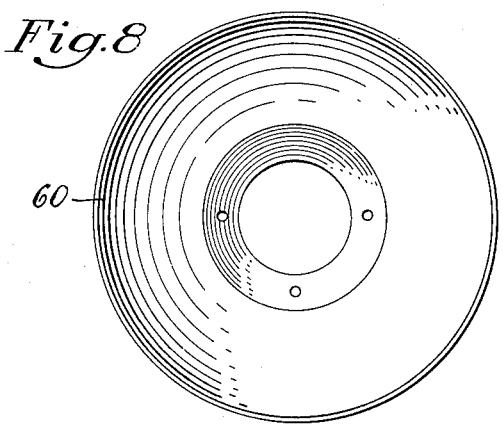
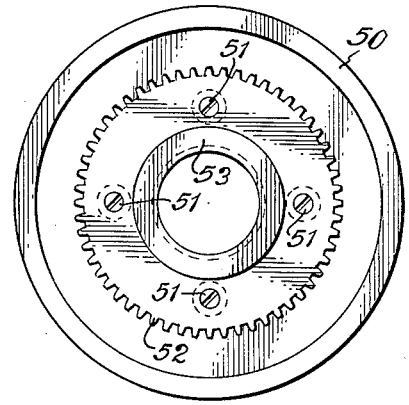
Inventor
Grant V. W. Roth
by Parker & Carter
Attorneys

United States Patent Office 2,719,282
Patented Sept. 27, 1955

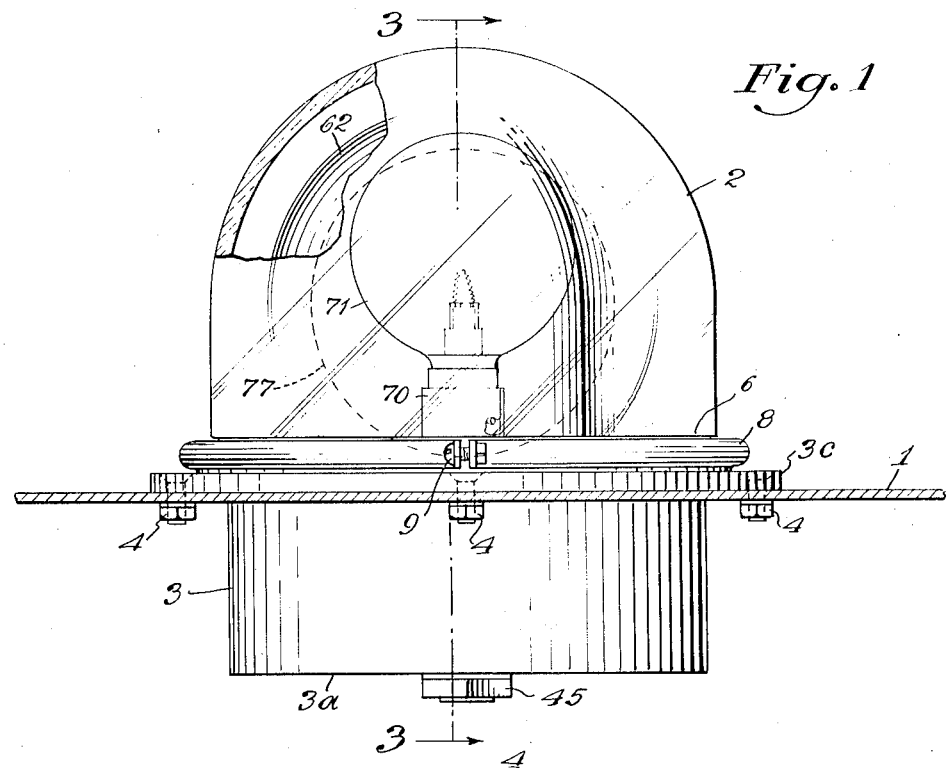
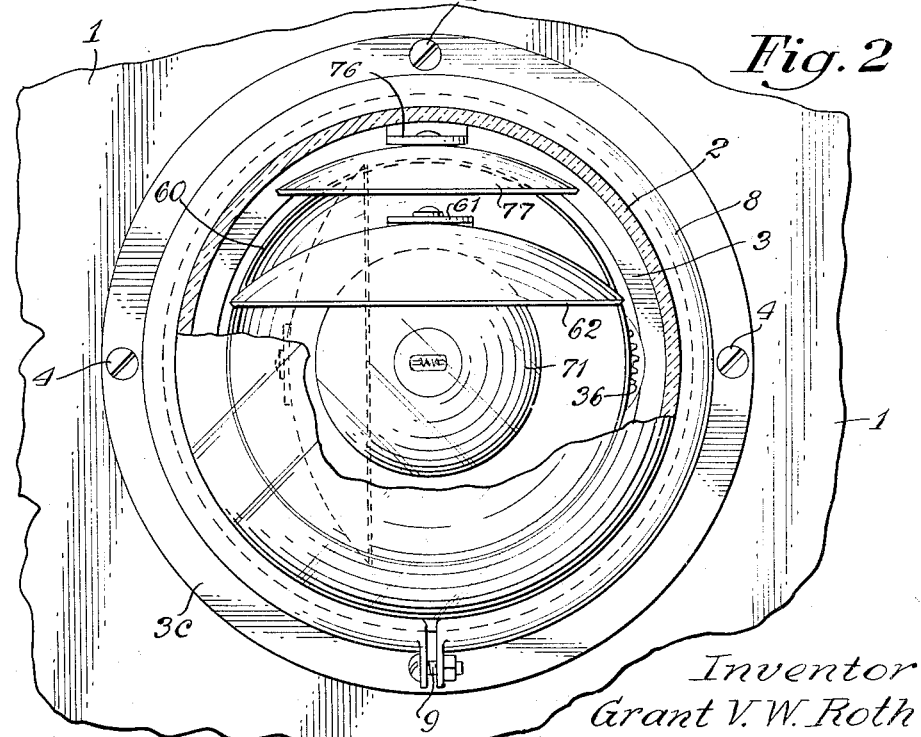

2,719,282
SIGNAL LIGHT

Grant V. W. Roth, Evanston, Ill.

Application December 9, 1953, Serial No. 397,119

8 Claims. (Cl. 340—25)

My invention bears relation to signalling and identification lights and particularly to signalling identification lights usable on and with aircraft, marine vessels, land vehicles and the like.

Presently known identification lighting systems for aircraft and other vehicles provide a means of illuminating such aircraft and certain of such systems provide a species of "flashing" lights, but these systems are subject to certain deficiencies in accomplishing completely the function intended.

The "flashing" light system described above becomes somewhat ineffective when the vehicle carrying such light is passing over or through an area in which other "flashing" lights are in operation. Further, such lights often fail to provide sufficient power for identification at great distances. Of equal importance, such "flashing" lights provide no means whereby the viewer thereof is enabled to determine accurately and promptly the position of the vehicle carrying such lights in relation to the viewer's position. For example, it is difficult to tell whether aircraft carrying such a "flashing" light is approaching or retreating from the viewer and to tell whether such an aircraft, or other vehicle, is above, below, to the right or left of the viewer.

Consequently, it is an object of my invention to provide an improved signal lighting system for use on aircraft and other vehicles which shall be effective to provide a maximum range of visibility of the light source.

Another purpose of my invention is to provide a lighting system effective to produce a plurality of varying light patterns, each such pattern being directed outwardly from the light source in a direction differing from the direction of remaining patterns, whereby the viewer may determine, from the pattern visible to the viewer, the position of the vehicle carrying the light in relation to the viewer.

Another purpose of my invention is to provide a signal light and mechanism which shall be effective to produce both a steady ordinary diffused light and a beam or beams of light.

Another purpose of my invention is to provide a signal and identification lighting system which shall be simple, easy and economical to produce; which shall be light and compact, yet one which shall be effective to produce a plurality of varying light patterns emanating in varying directions from a single light source.

Other purposes of my invention will appear from time to time in the course of the ensuing specification and claims.

Referring generally now to the drawings:

Fig. 1 is a side elevation;

Fig. 2 is a top view with parts broken away;

Fig. 3 is a side elevation, on a slightly enlarged scale, with parts in cross section, taken on the line 3—3 of Fig. 1;

Fig. 4 is a view taken on the line 4—4 of Fig. 3;

Fig. 5 is a perspective view of the device with the transparent dome normally employed with the device being removed;

Fig. 6 is a detail view illustrating a portion of the operating mechanism employed with the device, taken on the line 6—6 of Fig. 4;

Fig. 7 is a detail view illustrating the rotating base employed with my device;

Fig. 8 is a top view of a deflector employed in my device; and

Fig. 9 is a side elevation of the deflector illustrated in Fig. 8.

Referring now to the drawings, and particularly to Fig. 1 thereof, I illustrate a support 1. While I show the support 1 in Fig. 1, it will be realized that the structure may be attached directly to the outer frame or "skin" of an aircraft or other vehicle in much the same manner as illustrated in relation to the support 1 in Fig. 1. It will be appreciated that the location of the lighting structure itself is not critical. While the drawings illustrate my device in a generally upright position it should be observed that the light may be installed in an inverted position, e. g. on the bottom surface of an airplane.

In providing an effective signalling and identification lights for a vehicle, light rays emanating therefrom should be dispersed through a spacial area which may be generally defined by a generally hemispherical housing, illustrated in Fig. 1 at 2, which is, of course, substantially transparent, and by the vehicle to which the housing 2 is attached.

My device includes a base 3 which may be secured to the support or vehicle surface 1 in any suitable manner, such as by the nut and bolt connection 4.

As best seen in Figs. 3 and 4 the base 3 may be generally cylindrical and may include a bottom wall 3a and a central well 3b. The fixed base 3 includes an outwardly directed annular flange 3c through which the nut and bolt connection 4 may pass in order to secure the fixed base 3 to the support 1.

An upwardly extending flange 5 may be integral with the annular flange 3c and may be spaced outwardly from the vertical wall of the fixed base 3 to provide an abutment for the outer lower face of the transparent housing 2, as illustrated in Fig. 3. The outer lower face of the housing 2 may have adjacent its edge a groove 6 and the flange 5 may have a similar groove 7 in its outer face. A securing ring 8 may have its edges seated in the grooves 6 and 7 in order to secure the transparent housing 2 to the fixed base 3. The securing ring or clamp 8 may be tightened about the housing 2 and the vertical flange 5 by means of the nut and bolt connection 9.

Secured within the fixed base 3 is a motor housing or bracket 20 which supports an electric motor means 21 within the fixed base 3a. 22 and 23 illustrate electrical conduits leading to and from motor 21. The motor 21 has a shaft 24 extending outwardly from the bracket 20 within the fixed base 3a. The shaft 24 carries a worm gear 25. A gear 26 is in mesh with the worm gear 25 and is secured to a generally vertical shaft 27.

A generally circular plate 30, which may be made of Bakelite, for example, seats upon the vertical wall 31 of the fixed base 3 in a generally horizontal plane at a point intermediate the bottom wall 3a and the upper edge of the vertical wall of the fixed base 3. The shaft 27 extends upwardly through the plate 30 and has secured to its upper end above the plate 30 a gear 35. In mesh with the gear 35 is a gear 36 which is rotatably mounted on a shaft 37 which is secured to the plate 30 as by the nut and bolt connection 38. Also rotatably mounted on the shaft 37, for rotation with the gear 36, is a gear 39.

Secured to the fixed base 3, as by the nut and bolt connection 45, is a vertical shaft 46 which may be hollow to permit the passage therethrough of the electrical conduits 22, 23. As best seen in Fig. 3, the vertical shaft 46 extends upwardly from the fixed base 3 above the upper edge of said fixed base and through the plate 30. A flange 47 on the shaft 46 seats upon the upper face of the plate 30 and serves, in co-operation with the nut and bolt connection 45, to clamp the plate 30 and the fixed base 3 together. A bearing member 48 may surround the shaft 46 and may seat upon the flange 47.

Mounted for rotation about the shaft 46 is a rotatable base or plate 50 which may be circular and which may carry adjacent its lower face, as by the bolts 51, a gear 52 which is in mesh with the gear 39. The gear 52 may carry a bearing ring 53 which may seat upon the bearing member 48. Thus it will be seen that the electric motor 21, when actuated, causes through rotation of the worm gear 25, and the gears 26, 35, 36 and 39 and 52, a rotation of the plate 50.

Secured to the upper face of the rotatable plate 50, and in angular relationship therewith, is an upwardly directed reflector 60, which surrounds the shaft 46 for rotation thereabout. A bracket 61 supports a vertically disposed reflector 62. The bracket 61 has a lower end portion adapted to surround shaft 46 for rotation thereabout and adapted to carry the threaded connecting member 63 which may be threaded through the reflector 60 into the base 50 and which may thus secure the reflectors 60 and 62 to the base 50 for rotation therewith about the shaft 46. A retaining member 64 may surround the shaft 46 above the lower extension of the bracket 61 and may be secured to the shaft 46 by a threaded pin 65 in order to position the reflector 60 and bracket 61 in relation to the base 50 and the shaft 46.

A light socket 70 is secured to the upper end of the shaft 46. It will be realized that the electric conduits 22, 23 extend upwardly through the shaft 46 to the contact points of the socket 70, as well as to the motor 21, to supply electrical energy to both the socket and the motor. As illustrated in Fig. 3, a light source 71 seats within the light socket 70 in a position generally in horizontal alignment with the center of the reflector 62 and in vertical alignment with the center of the reflector 60.

Secured to the vertical wall of the fixed base 3 as by the bolts 75 is a generally vertically disposed supporting bracket 76 having secured adjacent its upper end a third reflector 77 which is in general horizontal alignment with the reflector 62 and which has its reflecting concave face directed toward the light source 71.

It will be realized that all of the operating mechanism, as well as the light source and reflectors, above described, are positioned within the vertical boundaries generally defined by the vertical walls of the fixed base 3. While Fig. 3 illustrates the reflectors 60, 62 as being in one position of rotation, Fig. 5 illustrates the reflectors 60, 62 in another position of rotation in relation to the fixed base 3 and the fixed reflector 77.

It will be realized that whereas I have described and illustrated a practical and operative device, nevertheless, many changes may be made in the size, shape, number and disposition of parts without departing from the spirit of my invention. I, therefore, wish my description and drawings to be taken as in a broad sense illustrative or diagrammatic, rather than as limiting me to my precise showing.

The use and operation of my device are as follows:

The fixed base or supporting structure 3 may be appropriately secured to the structure of an airplane or other vehicle. The reflectors 60, 62 and 77 enclosed within the transparent housing 2 produce a plurality of movable light beams emanating from the transparent housing, thus effectively covering a hemispherical area. It is well-known that a beam of light can be seen for a greater distance than can a light source of the same intensity with no specific beam.

The parabolic reflector 60 produces an upwardly directed beam of light by reflecting the light rays from the light source 71 upwardly. Since the reflector 60 is offset in relation to the rotating base 50 and since the reflector 60 rotates with the base 50, the upwardly directed beam produced by the reflector 60 is caused to gyrate as the base 50 rotates. This produces a particular and easily identifiable light pattern to a viewer viewing the vehicle from above. It will be understood that the beam of light created by the reflector 60, since the reflector 60 is off-set or inclined from the horizontal, is directed upwardly in an inclined plane. Since the reflector 60 is rotated with the base 50, a gyrating motion is imparted to the inclined beam emanating from the reflector 60. While the reflector 60 is rotated in its plane inclined in relation to the base 50, I have, for clarity, described its action as gyration, since the axis of the reflector 60 is in fact given a gyrating motion in relation to the vertical axis of the base 50 upon rotation of the base and reflector 60.

The vertically disposed reflector 62 rotates with the base 60 and thus produces a generally horizontal rotating beam by reflecting outwardly from the transparent housing, in the form of a beam, the light rays from the light source 71.

If it be considered that the device, as illustrated in Fig. 3, were installed in relation to a vehicle in such manner as to make the left-hand portion of the device, the "front" portion, i. e. if it be considered that the vehicle and the device illustrated in Fig. 3 in moving forward would move from right to left, viewing the structure as illustrated in Fig. 3, then it will be realized that a viewer approaching the vehicle from either side would have presented to him a flashing light as the rotating reflector 62 passed between the viewer and the light source 71 and then passed the light source 71 on its side opposite the viewer. Thus the viewer would be presented with a pulsating or flashing light, the pulsations or flashes occurring at an easily identifiable frequency, which may be predetermined by establishing the rate of rotation of the base 50 and with it the rate of rotation of the vertically disposed reflector 62. Thus the viewer from the side sees a flash of a light beam, a steady light unreflected, a "black-out," and another steady light in repeated sequence.

Considering the device as being installed in the manner set forth above, it is clear that a viewer approaching the vehicle "head-on" would see no light at all when the reflector 62 passes between the light source 71 and the viewer and when the reflector 62 passed to either side of the light source 71, since in the latter positions of the reflector 62, the fixed reflector 77 is effective to shield the viewer from the light emanating from the light source 71. When, however, the reflector 62 passed the light source 71 on its side opposite from the viewer, a circle or "halo" of light would be momentarily reflected from the reflector 62 around the smaller reflector 77. Thus the viewer approaching or being approached by the vehicle directly "head-on" would be presented with only a mere circle of light which would "flash" or appear only infrequently, with a total absence of light between "halos."

Continuing to consider the device as installed in the manner set forth above, a viewer approaching a vehicle from the rear would see a substantially continuous beam of light. When the rotating vertical reflector 62 is in the position illustrated in Fig. 3, the viewer approaching from the rear is, of course, presented with a beam of light created by the reflector 62. As the reflector 62 rotates away from the position in alignment with the fixed reflector 77, the viewer approaching from the rear continues to be presented with a beam of light which now is directed toward him by the fixed reflector 77. As the rotating vertical reflector 62 passes between the viewer and the light source 71 there is only a very momentary interruption of this substantially continuous light beam. Depending upon the speed of rotation of the base 50, and thus of the vertical reflector 62, this momentary interruption could be so rapid as to be almost imperceptible to the viewer from the rear. However, whatever the speed of rotation of the vertical reflector 62, the viewer from the rear is presented with a substantially continuous light beam which may be only very infrequently interrupted.

Thus, a viewer from above is presented with a continuous gyrating beam of light; a viewer from either side is presented with a pulsating or flashing beam of light, the flashes thereof being of an easily identifiable frequency, and being separated by a steady light, a black-out and a steady light; a viewer approaching from a forward position is presented with a substantially continuous lack of light broken only momentarily by a circle of light; and the viewer from the rear is presented with a substantially continuous light beam broken only momentarily by an interruption of this substantially continuous beam.

Thus it will be seen that I provide a simple yet compact means of creating three separate and easily distinguishable light patterns all emanating from the same housing and being produced by a plurality of beams of light, all of which are formed of the light rays emanating from a single light source 71.

I claim:

1. In a signal and identification light, means for creating a plurality of distinguishable light beams from a single fixed light source, including a first reflector mounted for gyration below said light source, a second reflector generally vertically mounted for rotation about said light source and a third reflector mounted in fixed position with relation to said light source.

2. In a signalling and identification light, a transparent housing, a single light source fixed within said housing, a plate rotatably mounted below said light source, an upwardly directed reflector mounted in angular relationship with said plate for rotation therewith below said light source, a second reflector secured in generally perpendicular relationship with said plate for rotation therewith about said light source.

3. The structure of claim 2 characterized by and including a third reflector fixed in relation to said transparent housing and adapted to direct a steady beam of light from said light source in one direction outwardly from said housing.

4. The structure of claim 3 wherein said third reflector is of less diameter than said second reflector.

5. The structure of claim 3 wherein said third reflector is vertically mounted in general horizontal alignment with said second reflector.

6. In a signalling and identification lighting system, a fixed base adapted to be secured to a vehicle, a transparent housing secured to said fixed base, a single light source within said housing and secured to said base, a plate mounted for rotation on said base below said light source, electric motor means on said base, a driving connection between said motor means and said plate, an upwardly directed reflector secured in angular relationship with said plate for rotation therewith below said light source and adapted, in response to rotation of said plate, to direct a beam of light upwardly through and beyond said housing in a gyrating pattern, a second reflector vertically supported on said plate for rotation therewith in general horizontal alignment with said light source and adapted to direct a rotating beam of light outwardly from said light source through and beyond said housing, and a third reflector fixed on said base and adapted to direct a generally horizontal fixed beam of light outwardly through and beyond said housing in one direction.

7. In a signal and identification light, a base, a light source fixed on said base, a reflector mounted for rotation in a generally horizontal plane about the vertical axis of said light source and a second reflector mounted for rotation in a generally vertical plane about the vertical axis of said light source.

8. In a signal and identification light, a base, a light source fixed on said base, a reflector mounted for gyration in a generally horizontal plane about the vertical axis of said light source and a second reflector mounted for rotation in a generally vertical plane about the vertical axis of said light source.

References Cited in the file of this patent

UNITED STATES PATENTS

| | | |
|---|---|---|
| 1,404,962 | Hutchinson | Jan. 31, 1922 |
| 1,548,958 | Sperry | Aug. 11, 1925 |
| 1,797,394 | Bassett | Mar. 24, 1931 |
| 2,578,239 | Gosswiller | Dec. 11, 1951 |